US012561455B2

(12) United States Patent
Singh et al.

(10) Patent No.: US 12,561,455 B2
(45) Date of Patent: Feb. 24, 2026

(54) SYSTEM AND METHOD OF SEQUENTIAL CYPHER ENCRYPTION BASED ON CONTEXTUAL MACHINE LEARNING POWERED PERFORMANCE TESTING ENGINE FOR PRODUCTION ENVIRONMENT

(71) Applicant: BANK OF AMERICA CORPORATION, Charlotte, NC (US)

(72) Inventors: Shailendra Singh, Maharashtra (IN); Saurabh Gupta, New Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 147 days.

(21) Appl. No.: 18/630,217

(22) Filed: Apr. 9, 2024

(65) Prior Publication Data

US 2025/0315537 A1 Oct. 9, 2025

(51) Int. Cl.
*G06F 21/60* (2013.01)
*G06F 11/3668* (2025.01)
*G06F 21/62* (2013.01)

(52) U.S. Cl.
CPC ........ *G06F 21/602* (2013.01); *G06F 11/3684* (2013.01); *G06F 21/6209* (2013.01)

(58) Field of Classification Search
CPC . G06F 21/602; G06F 21/6209; G06F 11/3684
See application file for complete search history.

(56) References Cited

U.S. PATENT DOCUMENTS

| | | | |
|---|---|---|---|
| 7,552,028 B2 | 6/2009 | Iwamoto | |
| 7,581,118 B2 | 8/2009 | Mcgovern | |
| 8,359,630 B2 | 1/2013 | Manessis et al. | |
| 10,097,443 B2 * | 10/2018 | Hittel | H04L 63/06 |
| 10,339,038 B1 * | 7/2019 | Singh | G06F 11/3684 |
| 2009/0202081 A1 | 8/2009 | Hammad et al. | |
| 2015/0356001 A1 * | 12/2015 | Murugesan | G06F 11/3688 |
| | | | 717/124 |
| 2019/0111317 A1 * | 4/2019 | Young | G06Q 50/01 |
| 2020/0133814 A1 * | 4/2020 | Prabath | G06F 16/21 |
| 2021/0263839 A1 * | 8/2021 | Kim | G06F 11/3058 |
| 2021/0295315 A1 | 9/2021 | Hammad et al. | |
| 2021/0326866 A1 | 10/2021 | Hurry et al. | |
| 2022/0366064 A1 * | 11/2022 | Nikoghossian | G06F 21/602 |
| 2024/0403295 A1 * | 12/2024 | Panikkar | G06F 16/24542 |

* cited by examiner

*Primary Examiner* — Vance M Little
(74) *Attorney, Agent, or Firm* — Moore & Van Allen PLLC; Nicholas C. Russell

(57) ABSTRACT

Systems, computer program products, and methods are described herein for sequential cypher encryption based on contextual machine learning powered performance testing engine for production environment. The present disclosure is configured to create a first set of testing data via a machine learning model (MLM) within a performance testing engine; encrypt the first set of testing data with a first encryption key; insert the encrypted first set into a lower environment within an application; test the lower environment with the encrypted first set; create a second set of testing data via the MLM; transfer the first encryption key to the second set of testing data; delete the first set of testing data within the lower environment using the first encryption key; encrypt the second set of testing data; and insert the encrypted second set of testing data into the lower environment.

20 Claims, 6 Drawing Sheets

100

130

140

140

110

140

140

140

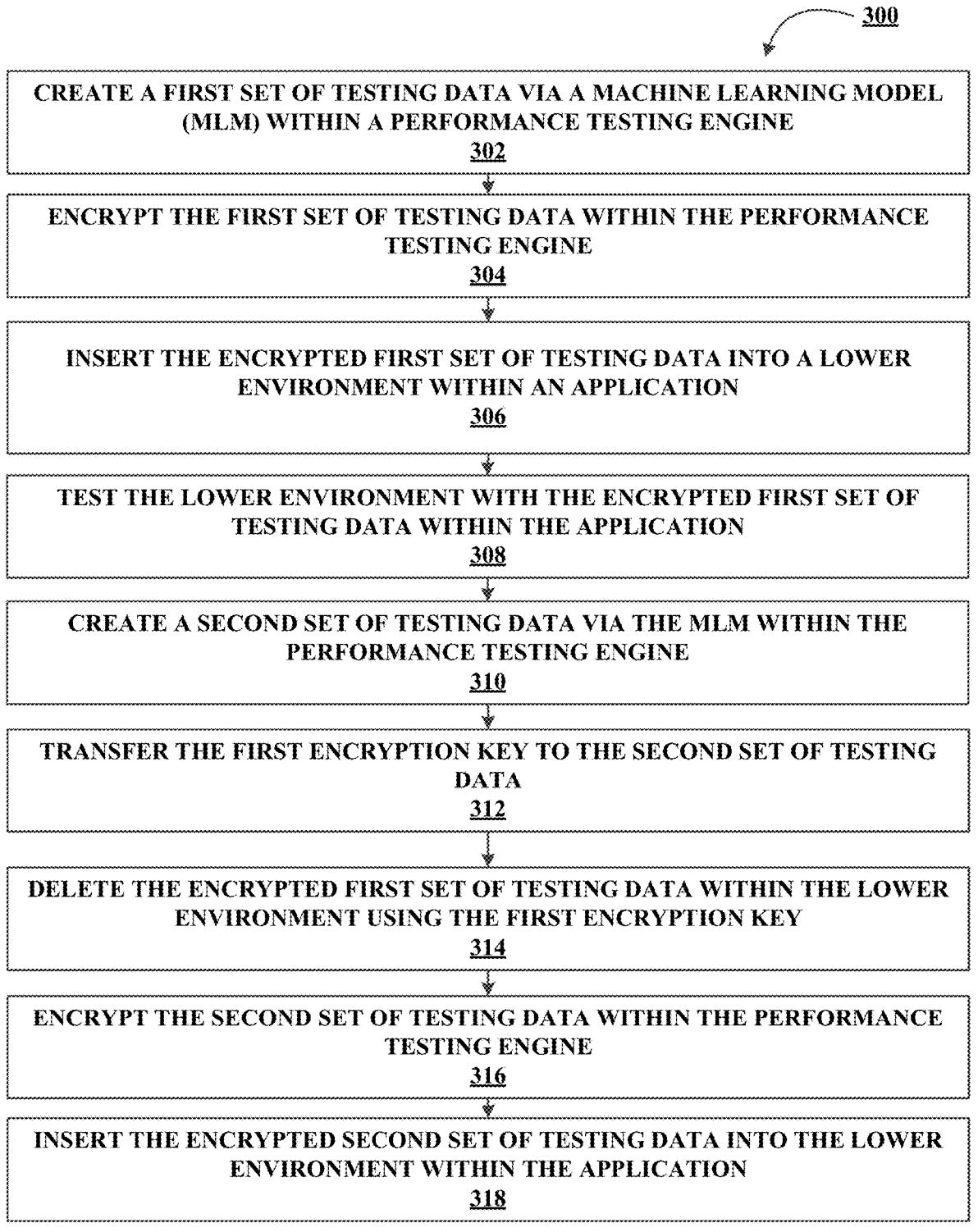

_300_

CREATE A FIRST SET OF TESTING DATA VIA A MACHINE LEARNING MODEL (MLM) WITHIN A PERFORMANCE TESTING ENGINE
302

ENCRYPT THE FIRST SET OF TESTING DATA WITHIN THE PERFORMANCE TESTING ENGINE
304

INSERT THE ENCRYPTED FIRST SET OF TESTING DATA INTO A LOWER ENVIRONMENT WITHIN AN APPLICATION
306

TEST THE LOWER ENVIRONMENT WITH THE ENCRYPTED FIRST SET OF TESTING DATA WITHIN THE APPLICATION
308

CREATE A SECOND SET OF TESTING DATA VIA THE MLM WITHIN THE PERFORMANCE TESTING ENGINE
310

TRANSFER THE FIRST ENCRYPTION KEY TO THE SECOND SET OF TESTING DATA
312

DELETE THE ENCRYPTED FIRST SET OF TESTING DATA WITHIN THE LOWER ENVIRONMENT USING THE FIRST ENCRYPTION KEY
314

ENCRYPT THE SECOND SET OF TESTING DATA WITHIN THE PERFORMANCE TESTING ENGINE
316

INSERT THE ENCRYPTED SECOND SET OF TESTING DATA INTO THE LOWER ENVIRONMENT WITHIN THE APPLICATION
318

FIGURE 3

SYSTEM AND METHOD OF SEQUENTIAL CYPHER ENCRYPTION BASED ON CONTEXTUAL MACHINE LEARNING POWERED PERFORMANCE TESTING ENGINE FOR PRODUCTION ENVIRONMENT

TECHNOLOGICAL FIELD

Example embodiments of the present disclosure relate to systems and methods of sequential cypher encryption based on contextual machine learning powered performance testing engine for production environments.

BACKGROUND

Performance testing of an application may be conducted through the introduction of testing data to said application. While this testing data may be used to assess the application, protection and removal of the testing data from the application is beneficial to associated operations and security infrastructure.

Applicant has identified a number of deficiencies and problems associated with sequential cypher encryption based on contextual machine learning powered performance testing engine for production environment. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for sequential cypher encryption based on contextual machine learning powered performance testing engine for production environment. In one aspect, a system for sequential cypher encryption based on contextual machine learning powered performance testing engine for production environment is presented. The system comprising a processing device, at least one non-transitory storage device, and at least one processing device coupled to the at least one non-transitory storage device wherein the at least one processing device may be configured to: create a first set of testing data via a machine learning model (MLM) within a performance testing engine; encrypt the first set of testing data within the performance testing engine, wherein the encrypted first set of testing data comprises a first encryption key; insert the encrypted first set of testing data into a lower environment within an application; test the lower environment with the encrypted first set of testing data within the application; create a second set of testing data via the MLM within the performance testing engine; transfer the first encryption key to the second set of testing data; delete the encrypted first set of testing data within the lower environment using the first encryption key; encrypt the second set of testing data within the performance testing engine, wherein the encrypted second set of testing data comprises a second encryption key; and insert the encrypted second set of testing data into the lower environment within the application.

In some embodiments, the MLM is configured to generate testing data based on a context associated with the application.

In some embodiments, encrypting sets of testing data form a sequential cypher encryption chain, wherein the sequential cypher encryption chain produces an encryption key configured to sequentially encrypt and delete sets of testing data.

In some embodiments, the lower environment within the application is configured to model a production environment of the application.

In some embodiments, the lower environment comprises models of databases, application logs, user interfaces, and application program interfaces of the production environment of the application.

In some embodiments, the second encryption key associated with the encrypted second set of testing data is configured to delete the encrypted second set of testing data.

In some embodiments, deleted encrypted sets of testing data are hidden from an end user within the application.

In another aspect, a computer program product for sequential cypher encryption based on contextual machine learning powered performance testing engine for production environment is provided. The computer program product comprising at least one non-transitory computer-readable medium having computer-readable program code portions embodied therein, the computer-readable program code portions which when executed by a processing device may be configured to cause the processor to perform the following operations: create a first set of testing data via a machine learning model (MLM) within a performance testing engine; encrypt the first set of testing data within the performance testing engine, wherein the encrypted first set of testing data comprises a first encryption key; insert the encrypted first set of testing data into a lower environment within an application; test the lower environment with the encrypted first set of testing data within the application; create a second set of testing data via the MLM within the performance testing engine; transfer the first encryption key to the second set of testing data; delete the encrypted first set of testing data within the lower environment using the first encryption key; encrypt the second set of testing data within the performance testing engine, wherein the encrypted second set of testing data comprises a second encryption key; and insert the encrypted second set of testing data into the lower environment within the application.

In some embodiments, the MLM is configured to generate testing data based on a context associated with the application.

In some embodiments, encrypting sets of testing data form a sequential cypher encryption chain, wherein the sequential cypher encryption chain produces an encryption key configured to sequentially encrypt and delete sets of testing data.

In some embodiments, the lower environment within the application is configured to model a production environment of the application.

In some embodiments, the lower environment comprises models of databases, application logs, user interfaces, and application program interfaces of the production environment of the application.

In some embodiments, the second encryption key associated with the encrypted second set of testing data is configured to delete the encrypted second set of testing data.

In some embodiments, deleted encrypted sets of testing data are hidden from an end user within the application.

In another aspect, a computer-implemented method for sequential cypher encryption based on contextual machine learning powered performance testing engine for production environment is provided. The computer-implemented method may include: creating a first set of testing data via a machine learning model (MLM) within a performance testing engine; encrypting the first set of testing data within the performance testing engine, wherein the encrypted first set of testing data comprises a first encryption key; inserting the encrypted first set of testing data into a lower environment within an application; testing the lower environment with the encrypted first set of testing data within the application; creating a second set of testing data via the MLM within the performance testing engine; transferring the first encryption key to the second set of testing data; deleting the encrypted first set of testing data within the lower environment using the first encryption key; encrypting the second set of testing data within the performance testing engine, wherein the encrypted second set of testing data comprises a second encryption key; and inserting the encrypted second set of testing data into the lower environment within the application.

In some embodiments, the MLM is configured to generate testing data based on a context associated with the application.

In some embodiments, encrypting sets of testing data form a sequential cypher encryption chain, wherein the sequential cypher encryption chain produces an encryption key configured to sequentially encrypt and delete sets of testing data.

In some embodiments, the lower environment within the application is configured to model a production environment of the application.

In some embodiments, the lower environment comprises models of databases, application logs, user interfaces, and application program interfaces of the production environment of the application.

In some embodiments, the second encryption key associated with the encrypted second set of testing data is configured to delete the encrypted second set of testing data.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
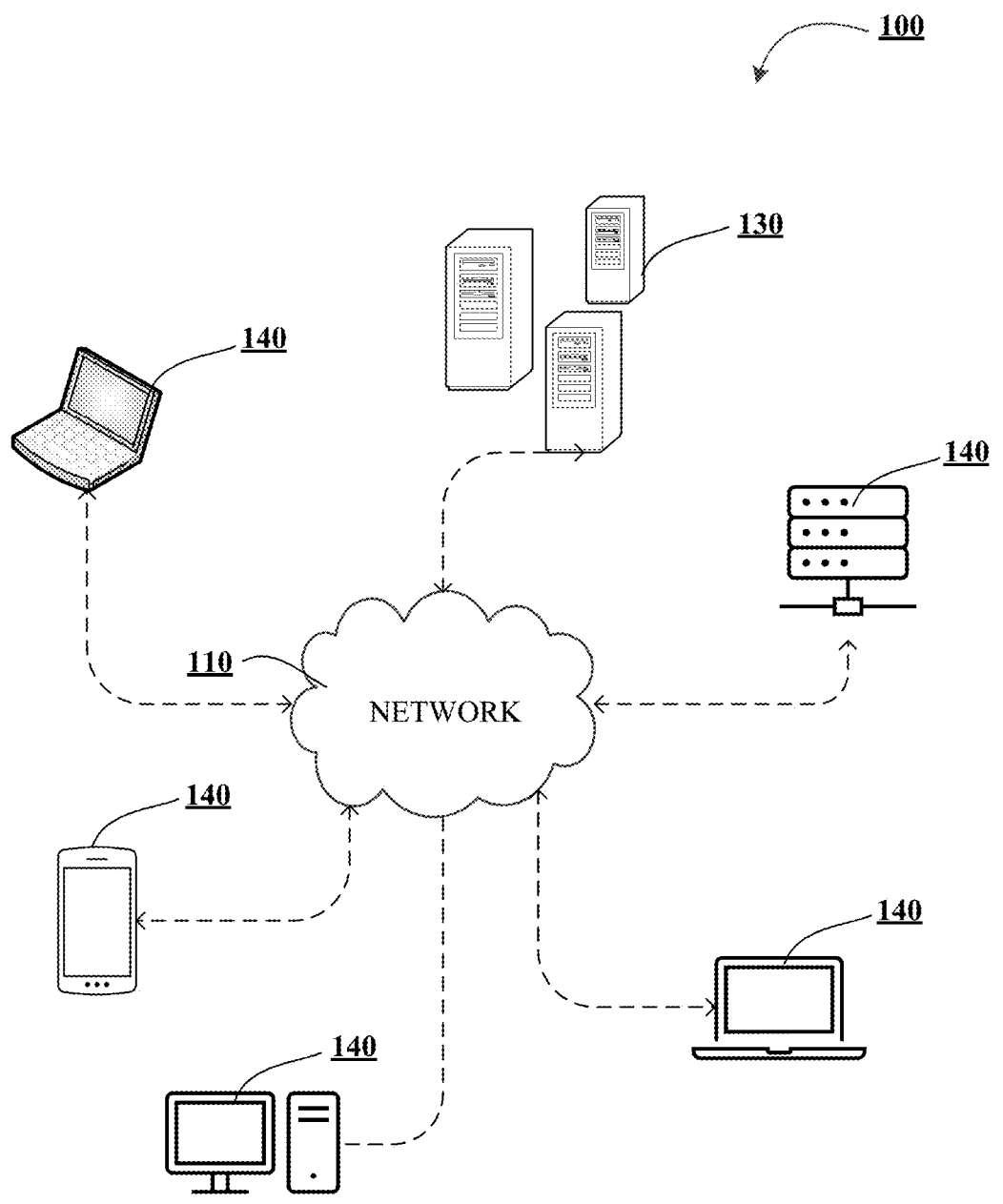
Figure 1B:
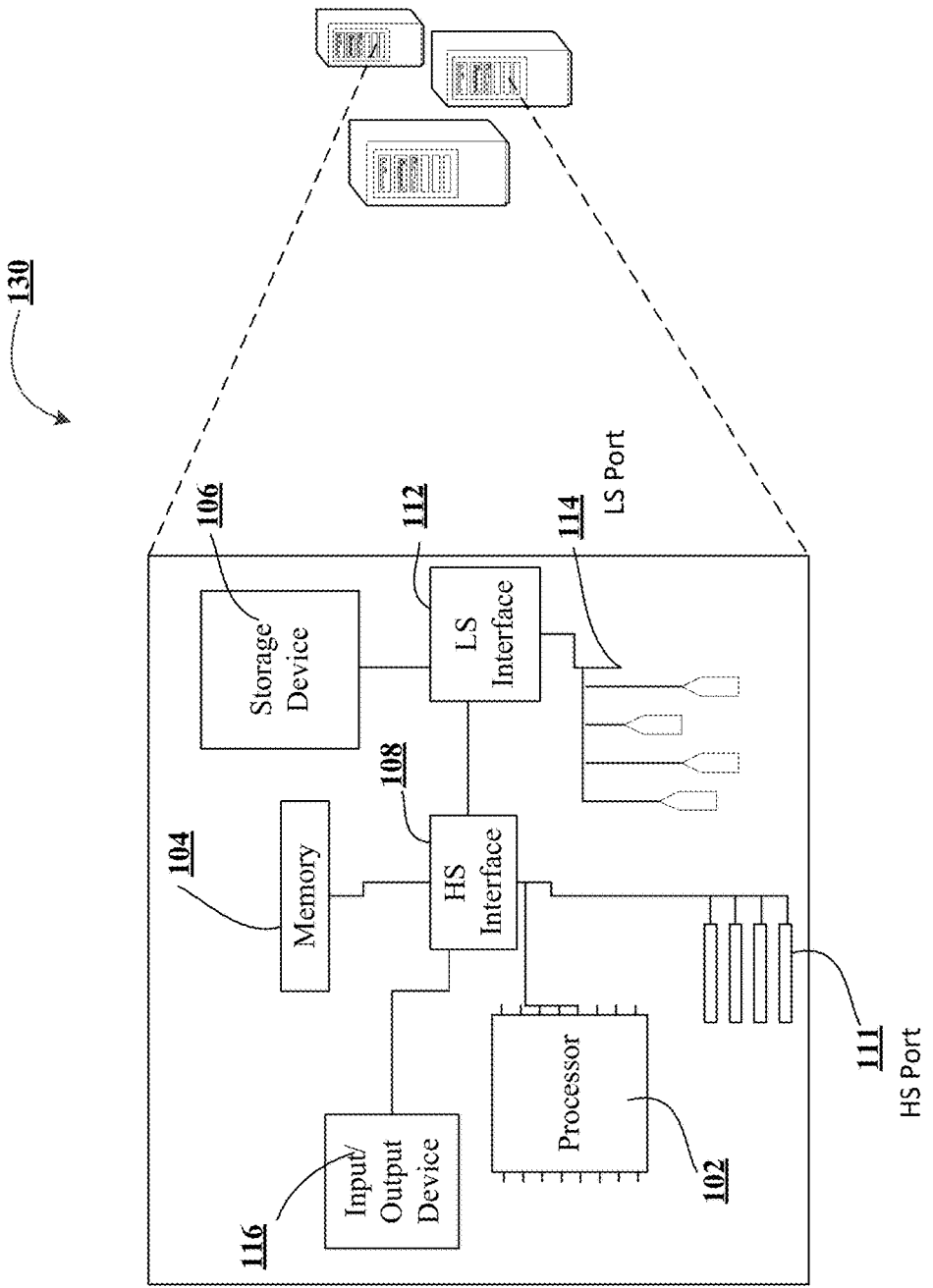
Figure 1C:
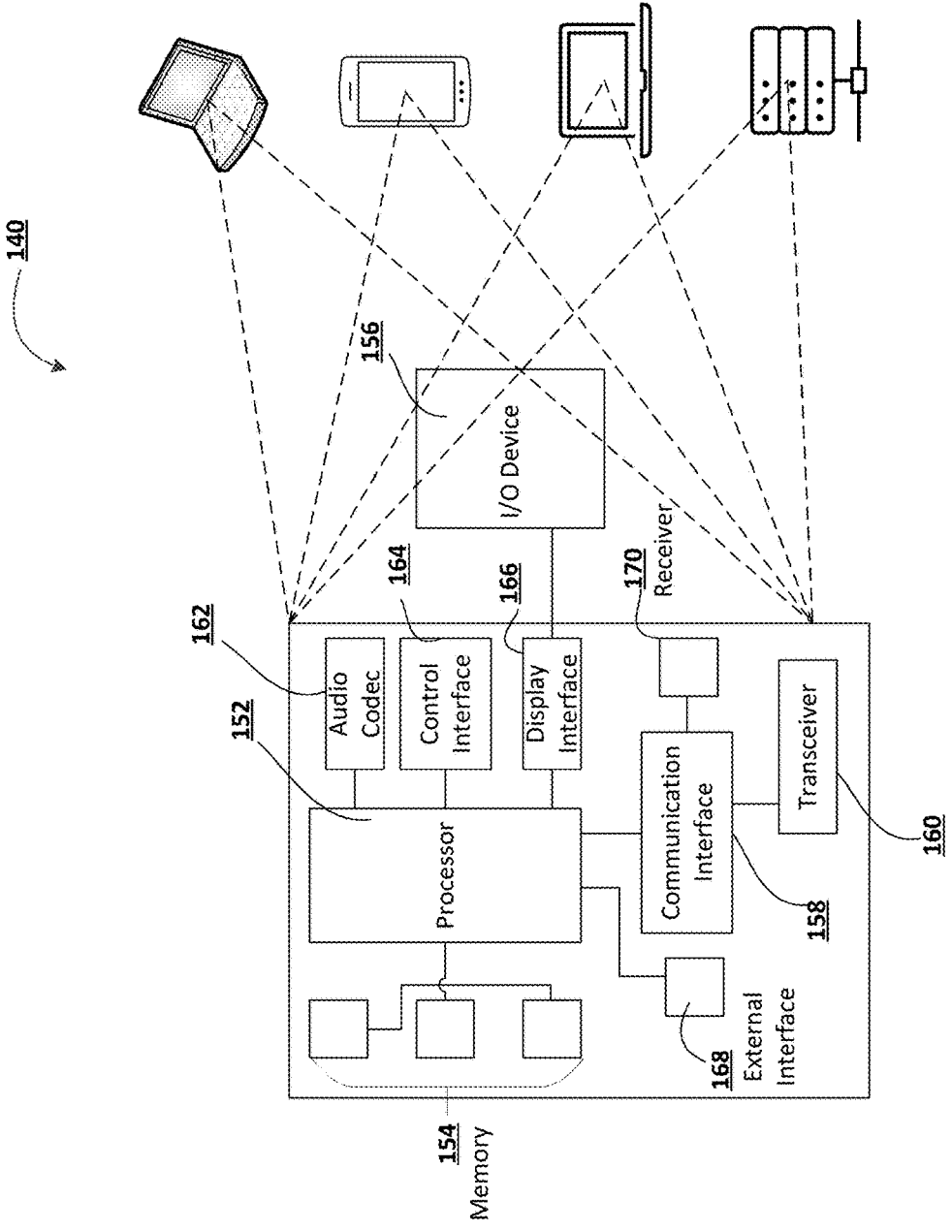
Figure 2:
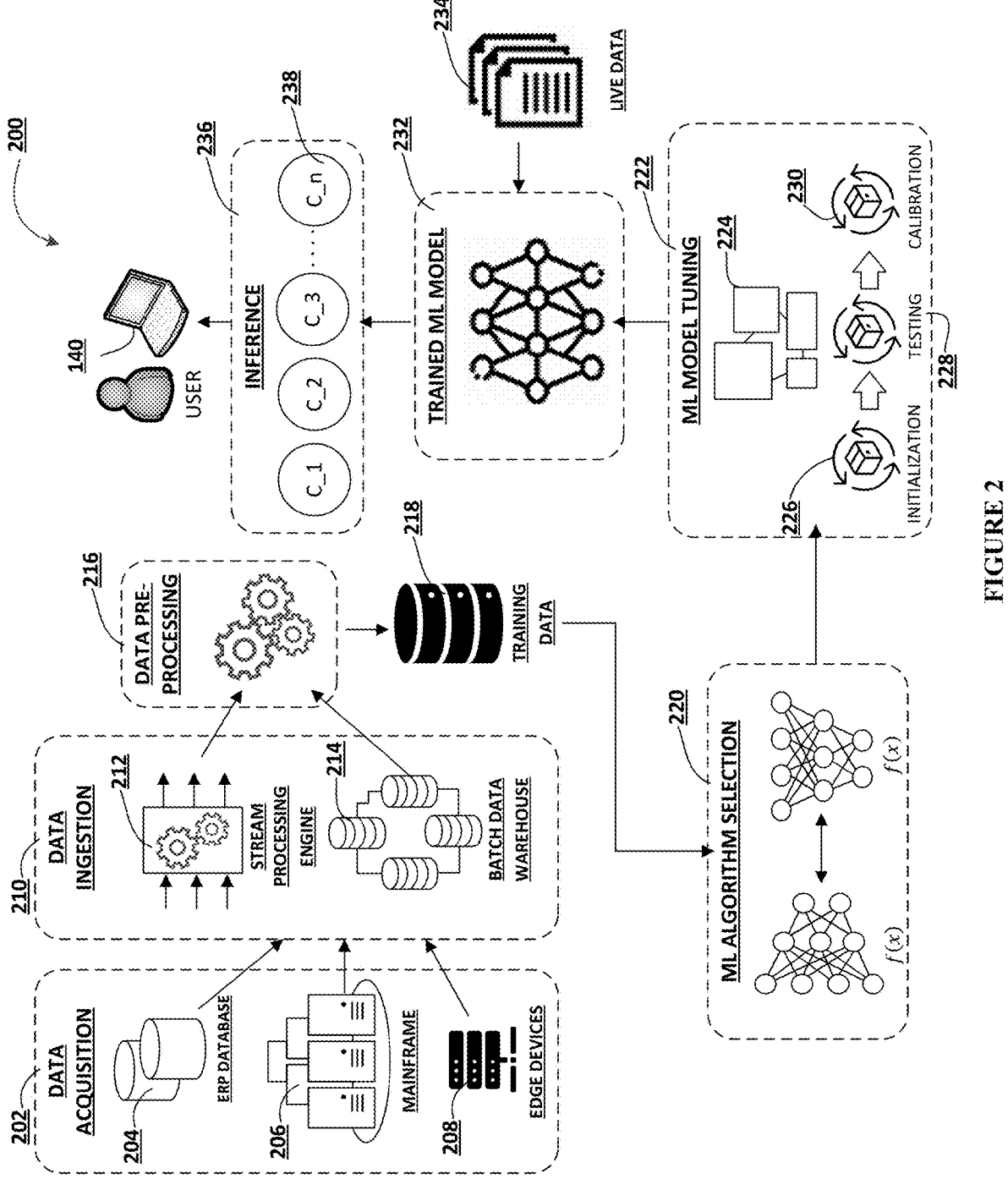
Figure 4:
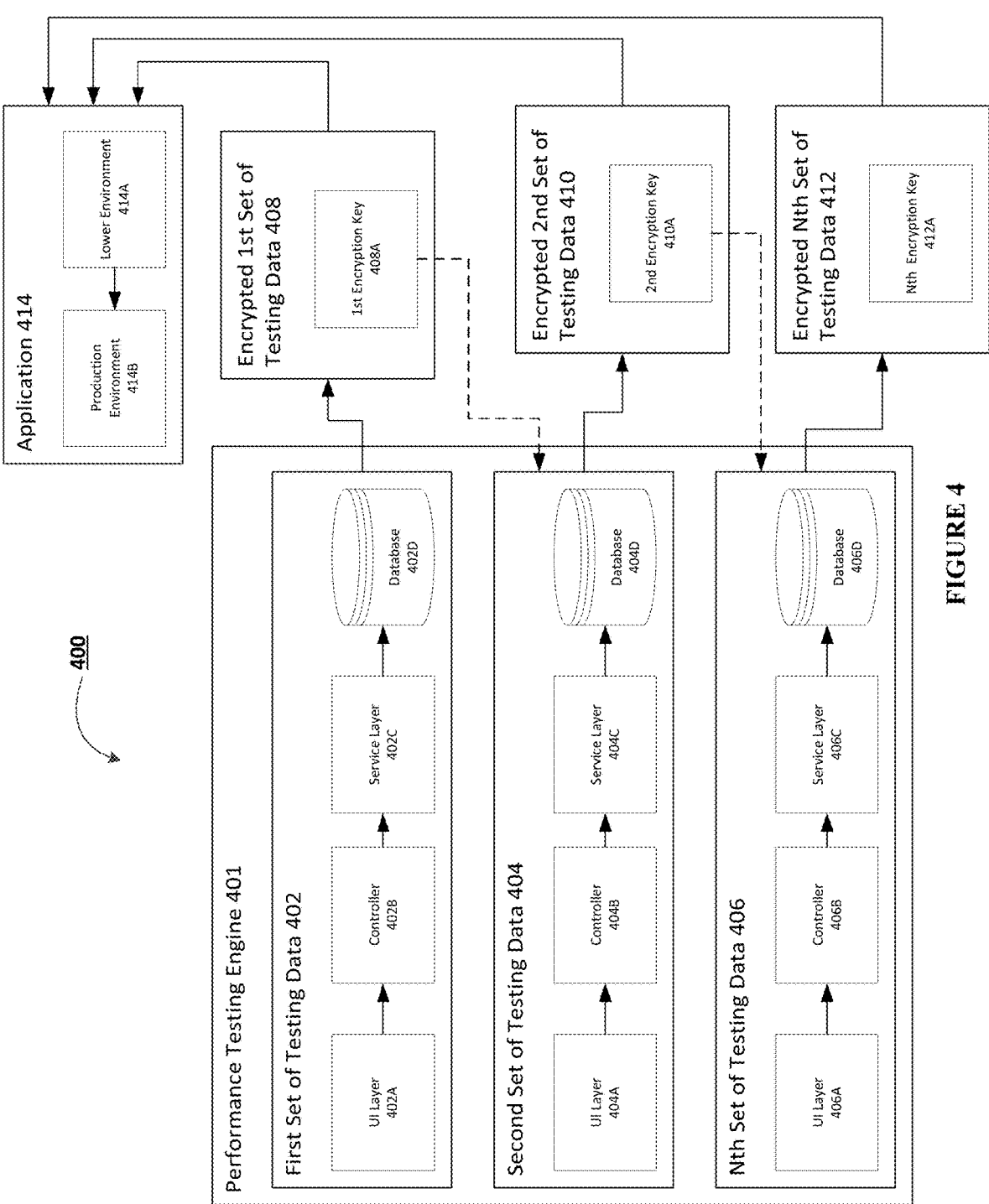

FIGS. 1A-1C illustrates technical components of an exemplary distributed computing environment for sequential cypher encryption based on contextual machine learning powered performance testing engine for production environment, in accordance with an embodiment of the disclosure;

FIG. 2 illustrates an exemplary machine learning (ML) subsystem architecture in accordance with an embodiment of the disclosure;

FIG. 3 illustrates a process flow for sequential cypher encryption based on contextual machine learning powered performance testing engine for production environment, in accordance with an embodiment of the disclosure; and FIG. 4 illustrates an exemplary architecture for sequential cypher encryption based on contextual machine learning powered performance testing engine for production environments.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

Performance testing of applications by increasing the load, stress, number of actions/interactions, and overall activity evaluates the capability and quality of an application. Further, performance testing an application may provide insight into strengths and weaknesses of said application. Persistence of testing data within the application after performance testing has been conducted may cause security, performance, and functionality concerns.

While performance testing an application may provide numerous benefits, the testing data used to assess the application must be protected and properly deleted from the application to maintain security. Even minor reductions in time in which the testing data is within the application or additional layers of security associated with testing data can enhance the functionality, stability, and security of the application. Additionally, the creation of testing data for an application may depend on the context and the infrastructure associated with the application.

To alleviate these concerns, testing data may be created using machine learning models and then fed to a lower environment of the application as opposed to the production environment of the application. A lower environment within the application may be configured to conduct performance testing using generated sets of testing data, and the production environment may be configured to perform functions of the application while in established operations or "normal" conditions. Said performance testing conducted on the application may determine, indicate, and highlight performance abilities of the application. Further, testing data used to conduct performance testing may be produced using machine learning models, which can use a context associated with the application. The use of machine learning may provide adaptability in terms of what components of the application can be tested and how performance testing may be conducted.

Accordingly, the present disclosure present disclosure describes how sequential cypher encryption based on contextual machine learning powered performance testing engine may assist in production environment testing within an application. Testing data created by machine learning models (MLM) may be created based on the application and the lower environment of the application (a model of the production environment of the application). The set of testing data may then be encrypted, with an accompanying encryption key. The testing data may then be inserted into the lower environment of the application, where performance testing may be performed to assess functions, measurements, and capabilities of the application. Upon completion of performance testing, a second set of testing data may be created and the encryption key of the first set of testing data may be transferred to the second set. The second set may then be encrypted with an accompanying second encryption key, while the first encryption key is used to delete/remove the first set of testing data from the lower environment and the application. The process of creating testing data, encrypting said data, testing the lower environment, then transferring the encryption key to the next testing data set may be repeated to ensure testing data is not visible within the application to end users and aspects of the application are repeatedly assessed.

What is more, the present disclosure provides a technical solution to a technical problem. As described herein, the technical problem includes the removal and protection of testing data from an application after conducting performance testing. The technical solution presented herein allows for sequential cypher encryption of testing data generated by machine learning. In particular, sequential cypher encryption of testing data generated by machine learning is an improvement over existing solutions to removal and protection of testing data from an application after conducting performance testing, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for sequential cypher encryption based on contextual machine learning powered performance testing engine for production environment 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relation-ships and patterns between variables in a dataset based on the input, or training data 218. A fully trained machine learning model 232 is one whose hyperparameters are tuned and model accuracy maximized.

The trained machine learning model 232, similar to any other software application output, can be persisted to stor-age, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using super-vised learning algorithms may be used to structure compu-tations in terms of categorized outputs (e.g., $C\_1$, $C\_2$ .... $C\_n$ 238) or observations based on defined classifications, represent possible solutions to a decision based on certain conditions, model complex relationships between inputs and outputs to find patterns in data or capture a statistical structure among variables with unknown rela-tionships, and/or the like. On the other hand, machine learning models trained using unsupervised learning algo-rithms may be used to group (e.g., $C\_1$, $C\_2$ .... $C\_n$ 238) live data 234 based on how similar they are to one another to solve exploratory challenges where little is known about the data, provide a description or label (e.g., $C\_1$, $C\_2$ .... $C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for sequential cypher encryption based on contextual machine learning powered performance testing engine for production environments. As shown in Block 302, the process flow 300 includes creating a first set of testing data via a machine learning model (MLM) within a performance testing engine. The first set of testing data may be data associated with an application and configured (within the performance testing engine) to simu-late performance tests and testing conditions for the appli-cation. In other words, the set of testing data may be data that tests the performance capabilities of the application. For instance, an application that may facilitate resource transfers between users within the application may be performance tested by creating artificial users, artificial data, and/or artificial resource transfers within the performance testing engine, which may then be transferred to the application as described in greater detail below. The influx of artificially created users/data/resources/transfers may provide insight into how the application responds to increased stress and activity. The application may be evaluated on a predeter-mined scoring metric to measure the responses, security, and durability of the application when subjected to the set of testing data (e.g., measurements of the application may be predetermined). The volume, size, and complexity of the set of testing data may be adjusted based on the application for which it was created. For instance, the set of testing data may be created to test the upper limits of interactions, requests, and or user activity of the application.

In some embodiments, the performance testing engine in which the set of testing data may be created may comprise machine learning models (MLMs), as described in FIG. 2. In still other embodiments, the application in which the set of testing data may be created may comprise functions, com-ponents, devices, infrastructures, and/or systems configured to accept the set of testing data. For instance, the application may be configured to conduct resource transfers, resource exchanges, interactions, and/or communications between a plurality of parties. The application may be performance tested by adding a set of testing data to the application (e.g., fabricated users performing fabricated resource transfers to simulate increased traffic associated with the application). The application may comprise a lower environment (in which testing data may be distributed and performance testing may be performed) and a production environment (in which the application may perform as configured during production/established operations). The lower environment may model the production environment to test the perfor-mance of the application during established operation. Fur-thermore, the lower environment of the application may receive sets of testing data to test predetermined compo-nents, capabilities, and standards of the application.

A machine learning model (MLM) may be a form of machine learning as described in FIG. 2. The MLM may generate sets of testing data using a context associated with the application. For instance, if the application is configured to conduct resource transfers between parties, the MLM may generate a set of testing data comprised of fabricated resource transfers between fabricated parties. The context of the application may be learned/modeled from the production environment of the application to generate sets of testing data. The volume and content of the set of testing data may be predetermined to test performance of the application. For instance, the application may be tested on the volume of resource transfers conducted within a predetermined win-dow of time. In another instance, the application may be performance tested on processing resource transfers with limited capabilities (e.g., a set of components of the appli-cation may be "stress tested", wherein the set of components are performance tested on maximum capabilities, loads, and processing abilities).

The set of testing data generated by the MLM may be distributed to the lower environment of the application. The set of testing data may be processed by the lower environ-ment of the application (e.g., fabricated resource transfers within the set of testing data may comprise fabricated data within databases, application logs, user interfaces, applica-tion programming interface (API) systems, etc.) modeled from the production environment of the application. The set of testing data distributed to the lower environment may be encrypted and/or hidden from end users of the application.

In some embodiments, the context associated with the application may be learned through exemplary data fed to the MLM. For instance, the MLM may be trained to generate sets of testing data through exposure to previously encoun-tered within the application. The generated sets of testing data from the MLM may be configured based on the context associated with the application.

As shown in Block 304, the process flow 300 may include the step of encrypting the first set of testing data within the performance engine. Encryption of the first set of testing data may be performed through a plurality of encryption methods (e.g., symmetric, asymmetric, homomorphic, hash function, etc.). Encryption of the first set of testing data may comprise a first encryption key, which may be used to decipher the encrypted first set of testing data. The first encryption key may decipher the encryption of the first set of testing data and delete the first set of testing data upon conclusion of performance testing.

In some embodiments, encryption of the first set of testing data may be part of a sequential cypher encryption chain used to sequentially encrypt the set of testing data. Sequential cypher encryption may chain encryption of sets of testing data together. For instance, a first set of testing data may be encrypted with a first encryption key. The first encryption key may be used to decipher the first set of testing data and delete and/or replace the first set of testing data from the lower environment. An encryption key for a set of testing data may be transferred between sets of testing data, forming a chain that enables deciphering, deletion, and replacement of the first set of testing data with the second set of testing data. The sequential cypher encryption may further be configured to perform encryption of sets of testing data to form an encryption chain, in which encryption of the first set of testing data protects a current set of testing data until the first set is replaced by the second set of testing data. The sequential cypher encryption may be extended a predetermined number of n times (e.g., the cycle of creation, encryption, insertion, testing of a previous set of training data, followed by the creation, encryption key transfer, deletion, encryption, and insertion of a current set of testing data may be performed an n number of times).

As shown in Block 306, the process flow 300 may include the step of inserting the encrypted first set of testing data into a lower environment within an application. Insertion of the first set of testing data into the lower environment of the application may commence performance testing of the application with the first set of testing data, as described in greater detail below. The lower environment within the application may receive the encrypted first set of testing data and transfer, process, allocate, and/or move the set of testing data to predetermined destinations within the application (e.g., user interface layers, controllers, service layers, databases, etc.).

The set of testing data may further be created within the performance testing engine, encrypted within the performance testing engine, and then inserted/transferred to a lower environment within the application to conduct performance testing. The lower environment within the application may be infrastructure configured to model a production environment of the application/conduct performance testing. For instance, an application that may facilitate resource transfers with the lower environment of the application may comprise testing data configured to test predetermined aspects of the application (e.g., response time, load capability, etc.). Sets of testing data inserted into the lower environment of the application may further be subject to deletion, as described in greater detail below.

As shown in Block 308, the process flow 300 may further include the step of testing the lower environment with the encrypted first set of testing data within the application. Testing the lower environment/performance testing of the application within the lower environment may be conducted with the encrypted first set of testing data previously inserted into the lower environment. For instance, the encrypted first set of testing data may be configured to test the lower environment of the application through a performance test to determine aspects, qualities, measurements, and capabilities of the application in the lower environment. Results of the conducted performance test may reflect on the capabilities and performance of the production environment and/or the application.

As shown in Block 310, the process flow 300 may further include the step of creating a second set of testing data via the MLM within the performance testing engine. The second set of testing data created by the MLM may be generated by context collected and/or learned by the MLM. The second set of testing data may be created within the performance testing engine like the creation of the first set of testing data (e.g., through a MLM within the performance testing engine). The second set of testing data may be configured to conduct performance testing of the application and may be configured to test overlapping aspects of the application tested by the first set of testing data with newly created testing data. In other words, properties of the application may be performance tested by varying values. For instance, a number of fabricated users or fabricated resource transfers conducted on the application may be adjusted for the second set of testing data. The adjustment of the second set of testing data may be configured to focus performance testing on response time of the application when confronted with a larger number of fabricated resource transfers than the first set of testing data.

As shown in Block 312, the process flow 300 may further include the step of transferring the first encryption key to the second set of testing data. Transfer of the first encryption key to the second set of testing data may be configured to replace, overwrite, and/or delete the first encrypted set of testing data with the second set of testing data. An encryption key may be transferred from one set of testing data to another set of testing data. For instance, an encrypted first set of testing data may transfer the associated encryption key to a second set of testing data.

As shown in Block 314, the process flow 300 may further include the step of deleting the encrypted first set of testing data within the lower environment using the first encryption key. Deletion of the first set of testing data within the lower environment may occur using the first encryption key provided during encryption of the first set of testing data. The first encryption key may further be configured to decipher the encrypted first set of testing data before or after performance testing has been conducted. Deletion of the first set of encrypted testing data from the lower environment may be configured to hide the encrypted set of testing data from an end user within/of the application. An end user may be a user (as previously described), an individual, and/or a group interacting with the application.

As shown in Block 316, the process flow 300 may further include the step of encrypting the second set of testing data within the performance testing engine. Encryption of the second set of testing data may be performed through a plurality of encryption methods (e.g., symmetric, asymmetric, homomorphic, hash function, etc.). The encrypted second set of testing data may comprise a second encryption key. The second encryption key may be configured to encrypt and delete the encrypted second set of testing data from the lower environment of the application.

As shown in Block 318, the process flow 300 may further include the step of inserting the second set of testing data into the lower environment within the application. Insertion of the second set of testing data into the lower environment within the application may be similar to insertion of the first set of testing data. The encrypted set of first testing data, after performing performance testing on the application, may then be deleted/removed using the first encryption key and providing space for the second set of testing data.

Turning now to FIG. 4, wherein the exemplary architecture for sequential cypher encryption based on contextual machine learning powered performance testing engine for production environments 400 is provided, in accordance with an embodiment of the invention.

The performance testing engine 401 may be at least partially operated using a MLM, as described in FIG. 2. The performance testing engine 401 may create sets of testing data (e.g., first set of testing data 402, the second set of testing data 404, and the Nth set of testing data 406). The lower environment 414A of the application 414 may comprise a UI layer, a controller, a service layer, and a database. The created set of testing data may create testing data corresponding to each element of the lower environment 414A (e.g., the UI layer 404A, the controller 404B, the service layer 404C, and the database 404D). A set of testing data created within the performance testing engine 401 using MLM may be configured to match with elements of the lower environment of the application. For instance, the first set of testing data 402 may match the user interface layer (UI layer) 402A, the controller 402B, the service layer 402C, and the database 402D associated with the application. The user interface layer (UI layer) 402A may be an interface through which the application may communicate with (e.g., graphical user interface, command-line interface, and/or a web-based interface. The UI layer 402A may capture input, display information, trigger actions/events and provide communication with components of the application. The controller 402B may act as an intermediary between the UI layer 402A and the service layer 402C. The controller 402B may command and/or delegate tasks to components within the application. The controller 402B may further react to commands, requests, or input from the UI layer 402A and accordingly invoke corresponding actions in response. The service layer 402C may provide services, operations, or conduct interactions in response to the controller 402B. The service layer 402C may interact with the database 402D to transmit, receive, update, and/or interact with data stored within the database. The database 402D may store, manage, and/or organize data, and may communicate with the service layer 402C. A set of testing data may similarly be created and configured for a respective performance test (e.g., a second set of testing data 404 may comprise testing data for the database 404D).

A set of testing data (e.g., the first set of testing data 402 configured to interact with the UI layer 402A, controller 402B, service layer 402C, and the database 402D associated with the lower environment 414A of the application 414) may then be encrypted to form the encrypted first set of testing data 408. For instance, the first set of testing data 402 may become the encrypted first set of testing data 408, comprising a first encryption key 408A. Encryption of the first set of testing data 402 may be performed after creation within the performance testing engine 401 and conducted in a similar process for the second set of testing data 404, or sets of testing data created later (e.g., the nth set of testing data 406). The encrypted first set of testing data 402 (or the encrypted second set of testing data 410, or the encrypted Nth set of testing data 412) may then be inserted into the application 414, wherein performance testing may be conducted. In some embodiments, the encrypted first set of testing data 408 may be inserted into the lower environment of the application 414A to commence performance testing. Upon conclusion of the conducted performance testing, the encrypted set of testing data (e.g., the encrypted first set of testing data 408) may then be replaced by an encrypted second set of testing data (e.g., encrypted second set of testing data 410) after the encrypted first set of testing data is deleted using the first encryption key 408A. The cycle of creation, encryption, insertion, testing, creation, encryption, transferring the encryption key, and deletion may be conducted in a loop to a predetermined number of cycles.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for sequential cypher encryption based on contextual machine learning powered performance testing engine for production environment, the system comprising:
   a processing device;
   at least one non-transitory storage device; and
   at least one processing device coupled to the at least one non-transitory storage device, wherein the at least one processing device is configured to:
      create a first set of testing data via a machine learning model (MLM) within a performance testing engine;
      encrypt the first set of testing data within the performance testing engine,
      wherein the encrypted first set of testing data comprises a first encryption key;
      insert the encrypted first set of testing data into a lower environment within an application;
      test the lower environment with the encrypted first set of testing data within the application;
      create a second set of testing data via the MLM within the performance testing engine;
      transfer the first encryption key to the second set of testing data;
      delete the encrypted first set of testing data within the lower environment using the first encryption key;
      encrypt the second set of testing data within the performance testing engine, wherein the encrypted second set of testing data comprises a second encryption key; and
      insert the encrypted second set of testing data into the lower environment within the application.

2. The system of claim 1, wherein the MLM is configured to generate testing data based on a context associated with the application.

3. The system of claim 1, wherein encrypting sets of testing data form a sequential cypher encryption chain, wherein the sequential cypher encryption chain produces an encryption key configured to sequentially encrypt and delete sets of testing data.

4. The system of claim 1, wherein the lower environment within the application is configured to model a production environment of the application.

5. The system of claim 4, wherein the lower environment comprises models of databases, application logs, user interfaces, and application program interfaces of the production environment of the application.

6. The system of claim 1, wherein the second encryption key associated with the encrypted second set of testing data is configured to delete the encrypted second set of testing data.

7. The system of claim 1, wherein deleted encrypted sets of testing data are hidden from an end user within the application.

8. A computer program product for sequential cypher encryption based on contextual machine learning powered performance testing engine for production environment, the computer program product comprising at least one non-transitory computer-readable medium having computer-readable program code portions embodied therein, the computer-readable program code portions which when executed by a processing device are configured to cause a processor to perform the following operations:

create a first set of testing data via a machine learning model (MLM) within a performance testing engine;

encrypt the first set of testing data within the performance testing engine, wherein the encrypted first set of testing data comprises a first encryption key;

insert the encrypted first set of testing data into a lower environment within an application;

test the lower environment with the encrypted first set of testing data within the application;

create a second set of testing data via the MLM within the performance testing engine;

transfer the first encryption key to the second set of testing data;

delete the encrypted first set of testing data within the lower environment using the first encryption key;

encrypt the second set of testing data within the performance testing engine, wherein the encrypted second set of testing data comprises a second encryption key; and insert the encrypted second set of testing data into the lower environment within the application.

9. The computer program product of claim 8, wherein the MLM is configured to generate testing data based on a context associated with the application.

10. The computer program product of claim 8, wherein encrypting sets of testing data form a sequential cypher encryption chain, wherein the sequential cypher encryption chain produces an encryption key configured to sequentially encrypt and delete sets of testing data.

11. The computer program product of claim 8, wherein the lower environment within the application is configured to model a production environment of the application.

12. The computer program product of claim 11, wherein the lower environment comprises models of databases, application logs, user interfaces, and application program interfaces of the production environment of the application.

13. The computer program product of claim 8, wherein the second encryption key associated with the encrypted second set of testing data is configured to delete the encrypted second set of testing data.

14. The computer program product of claim 8, wherein deleted encrypted sets of testing data are hidden from an end user within the application.

15. A computer-implemented method for sequential cypher encryption based on contextual machine learning powered performance testing engine for production environment, the computer-implemented method comprising:

creating a first set of testing data via a machine learning model (MLM) within a performance testing engine;

encrypting the first set of testing data within the performance testing engine, wherein the encrypted first set of testing data comprises a first encryption key;

inserting the encrypted first set of testing data into a lower environment within an application;

testing the lower environment with the encrypted first set of testing data within the application;

creating a second set of testing data via the MLM within the performance testing engine;

transferring the first encryption key to the second set of testing data;

deleting the encrypted first set of testing data within the lower environment using the first encryption key;

encrypting the second set of testing data within the performance testing engine, wherein the encrypted second set of testing data comprises a second encryption key; and inserting the encrypted second set of testing data into the lower environment within the application.

16. The computer-implemented method of claim 15, wherein the MLM is configured to generate testing data based on a context associated with the application.

17. The computer-implemented method of claim 15, wherein encrypting sets of testing data form a sequential cypher encryption chain, wherein the sequential cypher encryption chain produces an encryption key configured to sequentially encrypt and delete sets of testing data.

18. The computer-implemented method of claim 15, wherein the lower environment within the application is configured to model a production environment of the application.

19. The computer-implemented method of claim 18, wherein the lower environment comprises models of databases, application logs, user interfaces, and application program interfaces of the production environment of the application.

20. The computer-implemented method of claim 15, wherein the second encryption key associated with the encrypted second set of testing data is configured to delete the encrypted second set of testing data.

* * * * *